Figure 1:
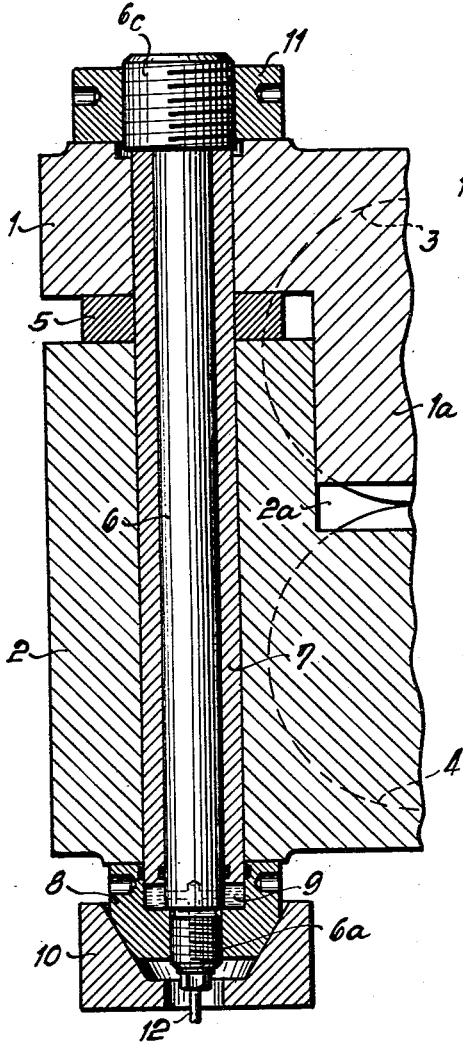

April 28, 1964   F. BLINN   3,130,628
ARRANGEMENT FOR ELONGATING A STAY BOLT MEANS OR TENSION
ANCHOR INDEPENDENTLY OF NUT MEANS ASSOCIATED THEREWITH
Filed Oct. 5, 1959   4 Sheets-Sheet 1

INVENTOR
F. Blinn
By Glascock Downing & Seebold
ATTYS.

April 28, 1964          F. BLINN          3,130,628
ARRANGEMENT FOR ELONGATING A STAY BOLT MEANS OR TENSION
ANCHOR INDEPENDENTLY OF NUT MEANS ASSOCIATED THEREWITH
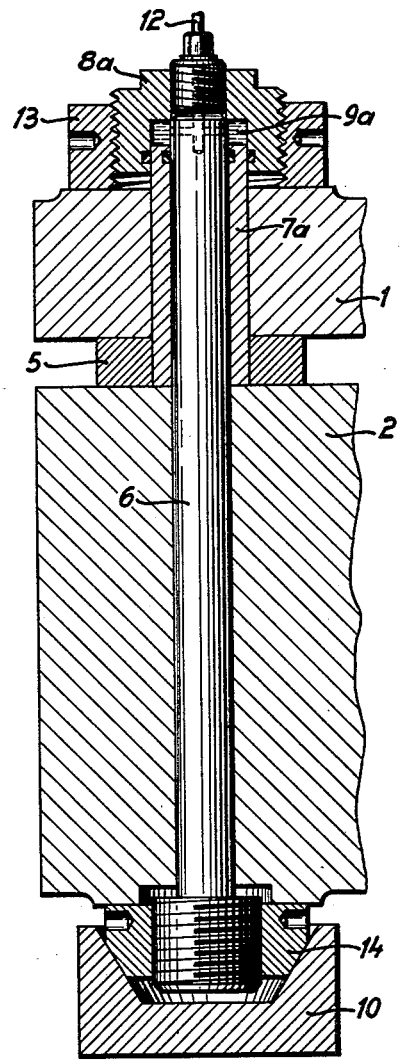
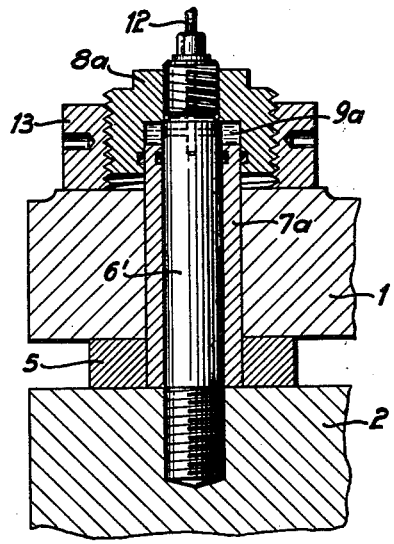
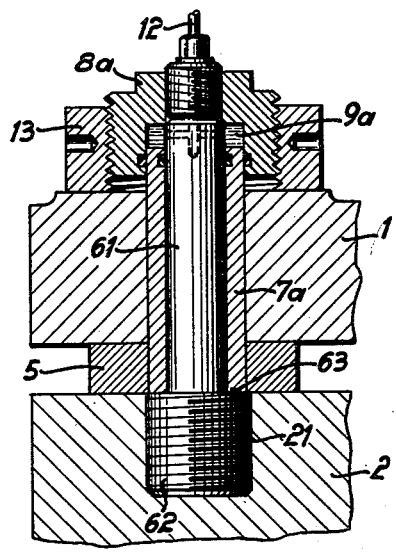
INVENTOR
Franz BLINN INVENTOR
Franz BLINN

ATTYS.

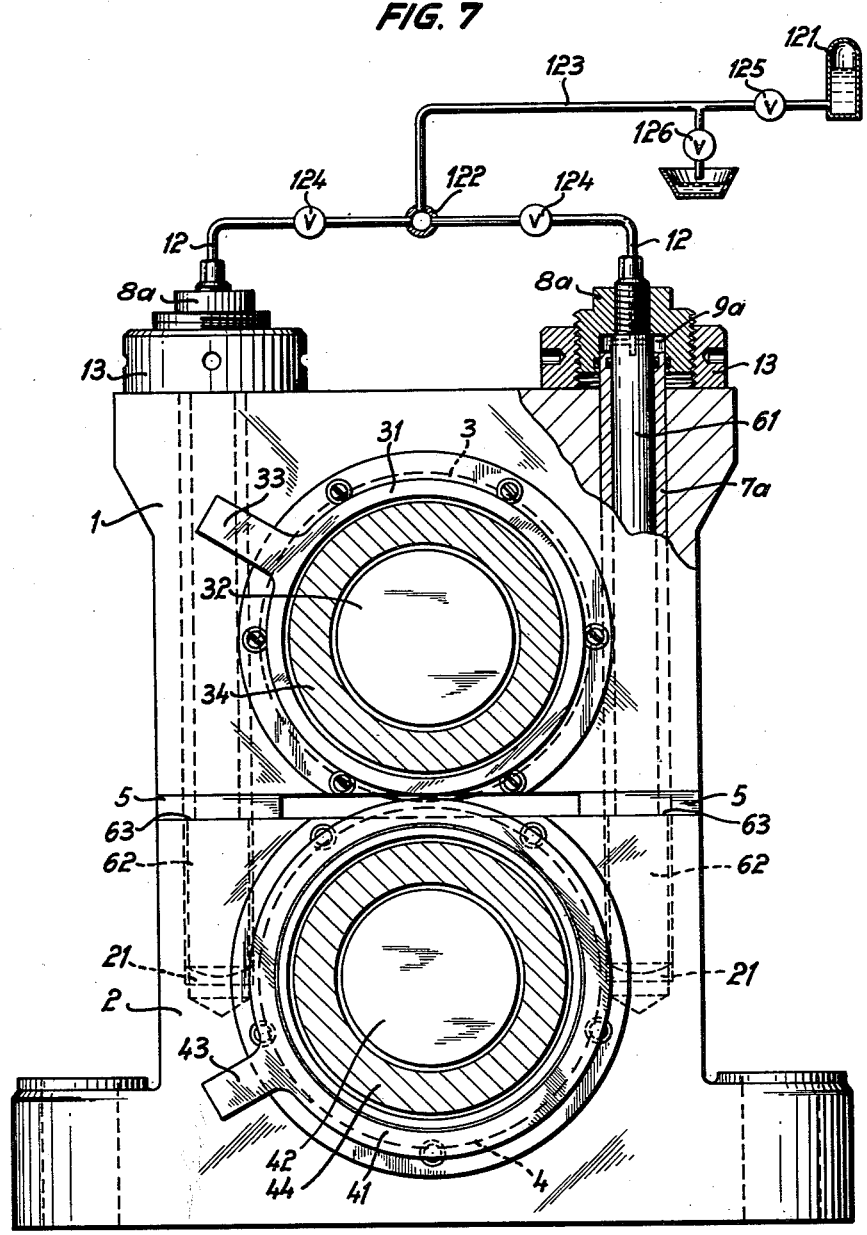

United States Patent Office 3,130,628
Patented Apr. 28, 1964

3,130,628
ARRANGEMENT FOR ELONGATING A STAY BOLT MEANS OR TENSION ANCHOR INDEPENDENTLY OF NUT MEANS ASSOCIATED THEREWITH
Franz Blinn, St. Ingbert, Saar, Germany, assignor to Moeller & Neumann G.m.b.H., St. Ingbert, Saar, Germany
Filed Oct. 5, 1959, Ser. No. 844,229
Claims priority, application Germany Oct. 6, 1958
4 Claims. (Cl. 85—1)

The present invention relates broadly to the art of connecting means for interconnecting at least two structural parts. More particularly, this invention relates to an arrangement for securing structural parts together by the use of cooperable stay bolt and nut means.

Specifically, the invention relates to an arrangement for elongating a stay bolt means or tension anchor independently of nut means associated therewith.

In the art of connecting structural parts, especially securing together in a definitely related position roll mounts of frameless rolling mills, it is known to incorporate stay bolt means passing through the respective mounts and to have tightening nut means engageable with the stay bolt means to apply a tightening force against at least one of the mounts to secure them in position.

It is further known to provide an arrangement that facilitates the tightening and loosening of the strongly loaded adjusting or tensioning nut or nuts which utilizes hydraulic force to elongate the stay bolt means so that the nut can then be tightened or loosened as desired. In one arrangement for this purpose, the hydraulic force applying means includes a piston part and a cylinder part, one of which is connected with one end of the stay bolt means or tension anchor, and the other of which bears against one of the structural parts to be tensioned. In this arrangement, while the hydraulic force will elongate the stay bolt means to unload the nut so that it can be tightened or loosened, the bracing of one of the cylinder and piston parts against the structural part during such elongation prevents any change in position of the structural parts without a prior loosening of the tensioning nut.

This invention is predicated upon providing an arrangement which will enable the elongation of a stay bolt means associated with a divided roll stand of a rolling mill arrangement or with a so called standless roll mount independently of the tightening nut and without establishing any reactive force on one of the roll mount parts so that upon elongation of the stay bolt, the tensioning nut moves with the same, making it possible that one of the roll mounts can move relative to the other. This results that jammed rolls in such a rolling mill could be loosened if stock that was too cold or too thick has become jammed in the rolls.

Consequently, the present invention is directed to improvements in known arrangements for hydraulically elongating stay bolts independently of a tensioning nut or nuts so that simultaneously with this elongation, the structural parts that have been tensioned are relieved from such tension.

In prior application, Serial No. 760,421, filed November 11, 1958, in the names of Karl Neumann and Franz Blinn, now Patent No. 2,934,968, issued May 3, 1960 and entitled "Hydraulic Bolt Stressing System," it has been disclosed to provide a tubular stay bolt and associated therewith hydraulic pressure providing means so that this pressure acts on the interior of this bolt to elongate the stay bolt.

The present invention, therefore, has for a specific object to provide an improvement in arrangements for elongating stay bolt means by providing a solid stay bolt, as compared to one of tubular form in which the solid stay bolt has a smaller external diameter as compared with a tubular stay bolt of equal strength.

More particularly, the invention has for an object to provide a stay bolt and nut assembly of the type suitable for interconnecting superposed structural parts, such as divided roll mounts for a rolling mill which incorporates an arrangement for elongating stay bolt means independently of the associated tightening nut means in which a solid stay bolt means is mounted in openings or bores in the respective parts and has a threaded end adapted to protrude beyond the upper end face of the upper structural part. The other end of the stay bolt means is secured relative to the other structural part, tensioning nut means are provided for relative cooperation with the stay bolt means and at least one of the structural parts to secure them together in tension and fluid chamber-defining means are incorporated in the arrangement which include the exterior surface of a limited axial extent of the stay bolt means and a pair of spaced, opposed surfaces extending transversely of the axis of the stay bolt means that delimits an annular fluid-receiving chamber surrounding the exterior surface of the stay bolt means. One of these transversely extending surfaces is operatively associated with the stay bolt means, at least one of the transversely extending surfaces is axially movable relative to the other to transmit axial force to the threaded end of the stay bolt means and means are provided for supplying fluid to the chamber under sufficient pressure to effect relative movement between the transversely extending surfaces so as to elongate the stay bolt means and thus free the upper structural part from tension.

Still more specifically, the invention has for an object to provide an arrangement for elongating a stay bolt means to provide in a connection assembly of the stay bolt and associated nut type and which includes at least two structural elements to be connected, a solid stay bolt means, tightening nut means cooperable therewith to apply a tightening or tensioning force against at least one of the structural parts, and means for elongating the stay bolt means independently of the tightening nut means that includes a fluid receiving chamber delimited by a piston part and a cylinder part, one of these parts being connected with one end of the stay bolt means so that axial force can be transmitted into the stay bolt means for elongating the same, and the other part being braced against a support and in which one of said cylinder and piston parts is braced directly against the other end of the stay bolt means while bypassing at least one of the structural parts that is to be held in tension. With this arrangement, at least one of the structural parts such as the roll mounts or the frameless rolling mill can move away from the other without manipulating the tensioning nut with this relative movement being of an amount consistent with the movement of the tensioning nut in response to elongation of the stay bolt means. Thus, as an example, if the rolls of a frameless rolling mill are jammed, they can be loosened in a simple manner by elongating the stay bolt means.

As a specific object of the invention, consistent with the aforegoing object the cylinder part is operatively associated with one end of the stay bolt means in a pressure resisting manner and the piston part comprises a tube surrounding the stay bolt means at least throughout the length portion thereof that is to be elongated, whereby the bores in the structural parts, such as the roll mounts, need merely be enlarged by the amount of the cross section of the tubular piston part, which, in accordance with the teaching of the invention has to pass through at least one of the structural parts to be adjusted.

It is a further specific object of the invention to provide an arrangement which includes a solid stay bolt means passing through at least one of the structural parts to be connected and having an outer end projecting beyond the same and in which its other end is secured relative to the other structural part. A tubular means surrounds such stay bolt means, passing through at least one of the parts and has an end portion that surrounds at least part of the protruding end of the stay bolt means. An annular cylinder defining member is secured to the protruding end of the stay bolt means and surrounds the protruding part of the tubular member is in a fluid tight manner and a tensioning nut in threaded engagement with external threads on the annular cylinder defining member for cooperation with the adjacent structural part, whereby by the provision of suitable bores in the stay bolt means fluid under pressure can be conducted into the space defined between the exterior of a portion of the stay bolt means, the outer end of the tubular member, and the adjacent inner surfaces of the annular member.

If the stay bolt means is such as to pass completely through both structural parts such as two superposed roll mounts of a frameless rolling mill, the tubular member that forms the piston part of the hydraulic elongating arrangement can likewise pass through both structural parts and abut against a shoulder formed at one end of the stay bolt means. On the other hand, if the stay bolt means are such as to pass through one structural part and have a threaded end to be threaded into the other structural part, the tubular member that forms the piston of the hydraulic elongating arrangement need only pass through the one structural part and bear against the end surface of the other structural part.

Figure 2:
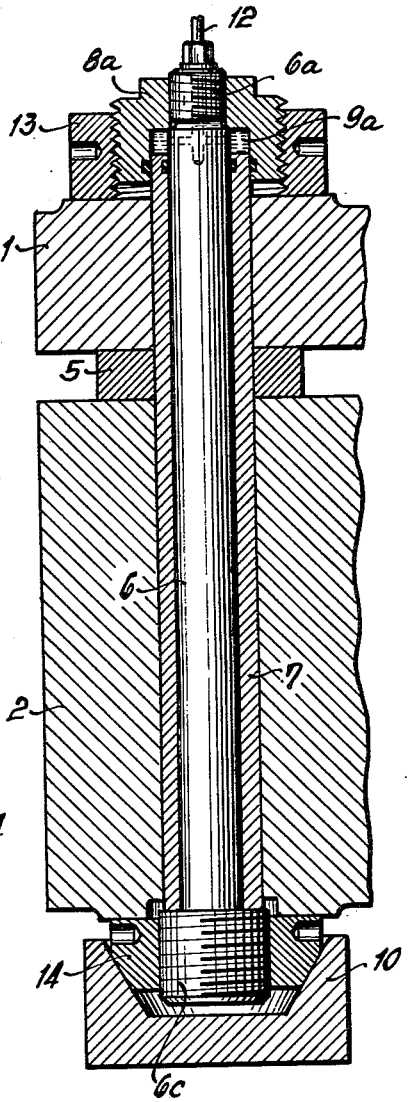
Figure 6:
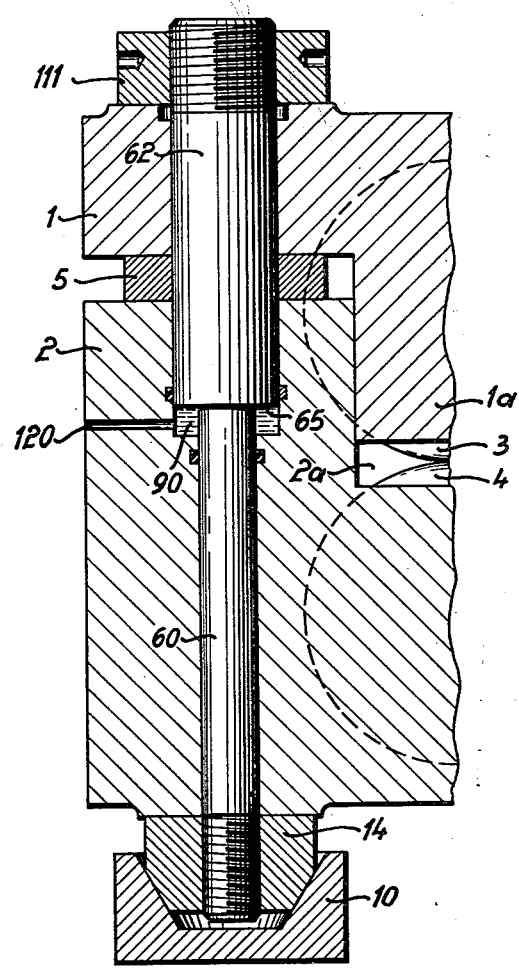

Further and more specific objects of the invention will be apparent from the following description taken in connection with the accompanying drawings in which:

FIGURE 1 is a fragmentary vertical cross sectional view through a portion of the roll housings on mounts of a divided or frameless roll stand in the plane of a stay bolt means with the latter being illustrated in elevation, FIGURE 2 is a similar view, but illustrating a modified arrangement of the invention, FIGURE 3 is a view similar to FIGURE 2 but which illustrates a further modification in which the stay bolt means is in threaded engagement with the other structural part, FIGURE 4 is a view similar to FIGURE 3 but illustrates a further modification in which the tubular member that surrounds the stay bolt is braced directly against a flange provided on the stay bolt, the latter being in threaded engagement with one of the structural parts, FIGURE 5 is a view similar to FIGURE 2 but illustrating a modification of that arrangement, in which the tubular member that surrounds a portion of the stay bolt and forms the piston part of the hydraulic elongating arrangement is of reduced axial length and has its inner end braced against one of the structural parts to be adjusted, and FIGURE 6 illustrates a further modification in a view similar to FIGURE 1, but in which the fluid-receiving chamber is formed between surfaces of the stay bolt and surfaces of the lower structural part, and FIGURE 7 is a side-view partly in vertical section from a frameless 2-high rolling mill with stay bolt means as shown in FIGURE 4.

In all forms of the invention, similar components bear the same reference characters. Thus, the roll housings are denoted at 1 and 2 and include apertures, not shown, for accommodating the necks of rolls indicated diagrammatically at 3 and 4, FIG. 1. These roll housings are interlocked by means of a depending projection 1a, that fits in a recess 2a of the lower roll housing. Between the undersurface of a part of the upper roll housing 1 and the upper surface of the lower roll housing 2 are provided spacer means 5. These spacer means can be either of the type that are known as exchangeable or replaceable spacer means or alternatively they can be of the type disclosed in prior filed application, Serial No. 760,421 now Patent No. 2,934,968, issued May 3, 1960. The stay bolt means is solid and is generally indicated at 6, and the tubular member that defines the piston part of the hydraulic stretching arrangement constitutes a pipe 7 that surrounds at least a portion of the length of the stay bolt 6.

In FIGURE 1, the housings or parts 1 and 2 are provided with vertical bores of a diameter sufficient to receive the stay bolt 6 and the surrounding pipe 7. The upper end of the stay bolt 6 is provided with an enlarged head 6c that is externally threaded and a tightening nut 11 is threadedly engaged therewith. The other end of the stay bolt 6 is provided with an externally threaded extension 6a on which is threaded an annular cup-shaped member 8 that includes an inner surface surrounding a portion of the pipe 7 that extends below the lower surface of the roll housing 2. Thus, suitable packings are provided between the annular member 8 and the exterior of the pipe 7 and the interior of pipe 7 and the exterior of the reduced portion of stay bolt 6 so that a fluid receiving chamber 9 is formed between the exterior surface of stay bolt 6 that extends beyond the end of pipe 7 and the interior surfaces of the annular cup-shaped member 8. The outer surface of this cup-shaped member 8 is conical so that it fits in a conical recess in a part 10 of a suitable base structure. This part is provided with a vertical bore through which protrudes a pipe 12 that communicates with an axial bore extending inwardly of the lower end of stay bolt 6. This axial bore is in communication with transverse bores in the stay bolt so that fluid under pressure can flow into the cylinder space 9. As indicated previously, the pipe 7 extends through both structural parts 1 and 2 and bears against the under surface of the head 6c of the stay bolt 6. The operation of this form of the invention is such that if a piece of stock being rolled is jammed between rolls 3 and 4, a high pressure from a suitable fluid pressure source is applied to the space 9 and this pressure acts on the lower end face of pipe 7 passing through all the inner braced parts and acts directly against the undersurface of head 6c of the stay bolt to elongate the stay bolt. The upper tensioning nut 11 follows this axial elongating movement so that the upper roll housing is freed from tension and the jammed rolls are loosened so that the stock can be removed. When the stay bolt 6 has been elongated so far that the nut 11 is loosened, this nut can be adjusted in a manner known per se.

FIGURE 2 shows a modification in which the hydraulic elongating arrangement and the adjustable tensioning nut are mounted at one and the same side of the roll stand, namely, at the top. In this form, the head 6c of the stay bolt is now beneath the lower roll housing and is externally threaded to receive a lower tensioning nut 14 which is not adjustable in operation. This lower tensioning nut has a conical outer surface fitting in a conical recess in a part of the base structure. The pipe 7 surrounds the stay bolt and protrudes above the upper face of the upper roll mount 1. In this form, both the stay bolt and the pipe 7 are somewhat longer than in the FIGURE 1 arrangement, so that the protruding end of the stay bolt 6 can accommodate the annular member 8a similar to the member 8 of FIGURE 1. This member 8a, however, is provided with external threads for receiving the upper adjusting nut 13. It is to be noted that in the FIGURE 2 arrangement, the lower surface of the annular member 8a is spaced above the upper surface of the upper roll housing 1, so that during elongation of the stay bolt by introducing fluid under pressure through conduit 12 and the associated bores in the stay bolt, the pressure in the cylinder space 9a acts directly against the upper end of the pipe 7 and the undersurface of the interior of the annular member or cylinder part 8a.

The form of the invention shown in FIGURE 2 which provides the cylinder and piston parts of the hydraulic elongating arrangement above the upper surface of the upper roll housing can likewise be incorporated with stay bolt means that do not pass completely through the lower housing 2, but are screwed into an internally threaded socket in the upper part of lower housing 2. In one form of this arrangement, FIGURE 3, the stay bolt 6' has an externally threaded lower end engaged in an internally threaded socket in the lower housing 2. The upper end of this stay bolt is externally threaded to receive the annular member 8a that together with a portion of the exterior of the surface of the stay bolt and the upper end surface of pipe 7a defines the working space 9a that receives fluid via pipe 12 and the bores in the stay bolt 6'. The tightening nut 13 is internally threaded for cooperation with external threads on the annular member 8a. In this form, pipe 7a has a length such as to pass through the upper housing 1 and the spacer 5 and its lower end bears directly on the upper surface of lower housing 2.

FIGURE 4 is a further modification of the arrangement shown in FIGURE 3, in which the recess or socket 21 in the lower housing 2 is of increased diameter and the stay bolt 61 is provided with an enlarged externally threaded end portion 62 defining a flange 63 on which bears the lower end of the pipe 7a.

In both forms of the invention shown in FIGURES 3 and 4, the pressure applied in the working space 9a effects elongation of the stay bolt means along its length of span, but this pressure does not react against the upper housing 1. In effect, in all forms of the invention previously described, the reactive pressure bypasses the upper housing 1 due to the fact that the pipe 7 passes therethrough.

It is also possible to provide an arrangement, FIGURE 5, in which the pipe 7a is of reduced axial length even though the stay bolt 6 passes through both housings 1 and 2. In this case, the bore through housing 1 is of greater diameter than the stay bolt-accommodating bore through housing 2 so that the lower end of pipe 7a bears directly against the upper face of housing 2, and thus the greatest available stretching length of stay bolt exist, whereas the pipe 7a is shorter so that the hydraulic pressure is applied to a greater extent in elongating the stay bolt as compared to the FIGURE 2 arrangement, wherein a greater amount of pressure is exerted in the form of compression on the pipe 7.

If it is desirable to provide an arrangement which embodies less elongation or a much higher maximum hydraulic pressure, then the structure can be modified as shown in FIGURE 6. In this instance, the working space 90 is delimited by the exterior surface of a reduced portion of the stay bolt 60, the undersurface of a shoulder 65 on the stay bolt, and the respectively facing surfaces of the recess in the housing 2 that accommodates the enlarged portion 62 of the stay bolt. The upper end of the stay bolt is externally threaded to receive an adjusting nut 111 and the lower end of the stay bolt 60 is threaded to receive a nut 14 mounted in a bearing part 10. The working fluid is applied to the space 90 via conduit 120 passing through the housing part 2. In this arrangement, the piston part is actually the face 65 of the enlarged part 62 of the stay bolt, whereas the cylinder part is provided by the lower end of the recess in the housing 2. Just as in all the other arrangements, no reactive force is applied on the upper housing 1 during elongation of the stay bolt, so that upon suitable elongation of the bolt, jammed rolls can be loosened.

It is self-evident that one of two nut means of a stay bolt system which need not be adjusted in operation, may be a solid part of the stay bolt means. Thus, nut 8 in FIGURE 1 and nut 14 in FIGURES 2 and 5 respectively may be part of stay bolt means 6.

Referring to FIGURE 7, there is illustrated a frameless 2-high mill including upper and lower roll housings 1 and 2 respectively at each side of the rolls 3 and 4, thus the mill having four stay bolt arrangements.

For a coarse adjustment of rolls 3 and 4 the spacer means 5 are exchanged for others of different height, whereas for fine adjustment of rolls during operation there are eccentric bearing blocks 31 and 41 being adjusted and in which not shown roller bearings are arranged for the roll necks 32 and 42. By twisting the eccentric bearing blocks 31 and 41 the distance between centre lines of rolls is changed. Arms of the bearing blocks attached by a not shown drive to twist the bearing blocks are indicated as 33 and 43. Boxes 34 and 44 are fixed on the roll necks 32 and 42 to receive the spindle heads of the roll drive.

Besides, a common supply arrangement for fluid pressure is schematically shown in FIGURE 7. The common supply arrangement serves to elongate the four stay bolt means 61 simultaneously or irrespectively one of another or by pairs. The working pressure is taken from a fluid accumulator 121 which is connected to a common supply pipe line 122 through pipe line 123. From this common pipe line 122, there are pipe lines 12 leading to every fluid receiving chamber 9a. Valves 124 are provided in pipe lines 12 for the individual actuation of the arrangements for elongating of each stay bolt means 61 according to the invention. They must be opened, if all stay bolt means of the mill shall be elongated or contracted simultaneously, and closed, if the tension of the corresponding stay bolt means shall not be changed.

For elongating one or more stay bolt means 61 valve 125 in pipe line 123 is opened. If, by the effect of elongating stay bolt means, the tensioning nuts 13 are tightened or loosened, or the jammed rolls 3 and 4 are loosened so that the stock can be removed, the elongation is broken off by closing valve 125 and opening bleeder valve 126.

What is claimed is:

1. A stay bolt structure for interconnecting structural parts, said bolt structure comprising an elongated bolt member extending through said parts, abutment means fixed to one end of said bolt member and engaging one of said parts, a second abutment means threadedly connected to the opposite end of said bolt member engaging the other of said parts, said threaded connection providing for adjustment of said second abutment means toward or away from said other part, an annular recess surrounding said bolt member to provide a hydraulic cylinder in one of said abutment means, a piston slidably received in said cylinder, said piston comprising a sleeve slidably received on said bolt member, said sleeve extending from within said cylinder into engagement with the other abutment means and means to apply fluid pressure to said cylinder, whereby upon application of fluid pressure to said cylinder said sleeve will move away from said one abutment means toward the other abutment means to force said abutment means apart and stretch said bolt member, thereby relieving the interconnecting force on said parts and permitting free adjustment of said second abutment means on said bolt member.

2. A stay bolt structure as defined in claim 1, in which one end of said bolt member terminates in an enlarged threaded head providing a shoulder, said second abutment means being threadedly received on said head, said cylinder being provided in said first abutment means, said sleeve extending through said parts and engaging said shoulder, whereby upon application of fluid pressure to said cylinder said sleeve will force said head and second abutment means away from said first abutment means to stretch said bolt member independently of said parts.

3. A stay bolt structure as defined in claim 1, in which one end of said bolt member terminates in an enlarged threaded head providing a shoulder, said first abutment means being threadedly received on said head, said second abutment means including an element fixed to said bolt member and a nut threadedly received on said element, said cylinder being provided in said element, said sleeve extending through said parts and engaging said shoulder, whereby upon application of fluid pressure to said cylinder said sleeve will force said head and first abutment means away from said second abutment means to stretch said bolt member independently of said parts.

4. A stay bolt for interconnecting structural parts, said bolt structure comprising an elongated bolt member extending through said parts, abutment means fixed to one end of said bolt member and engaging one of said parts, a second abutment means including an element fixed to said bolt member and a nut threadedly received on said element and engaging the other of said parts, an annular recess in said element surrounding said bolt member to provide a hydraulic cylinder, a piston slidably received in said cylinder, said piston comprising a sleeve slidably received on said bolt member, said sleeve extending from within said cylinder through said other part into engagement with said one part and means to apply fluid pressure to said cylinder, whereby upon application of fluid pressure to said cylinder said sleeve will force said one part and said first abutment means away from said second abutment means to stretch said bolt member independently of said other part, thereby relieving the interconnecting force on said parts and permitting free adjustment of said nut on said element.

References Cited in the file of this patent

UNITED STATES PATENTS

| | | |
|---|---|---|
| 43,246 | Waters | June 21, 1864 |
| 581,078 | Menne | Apr. 20, 1897 |
| 2,571,265 | Leufven | Oct. 16, 1951 |
| 2,774,263 | Leufven | Dec. 18, 1956 |
| 2,934,968 | Neumann et al. | May 3, 1960 |
| 2,964,015 | Garey | Dec. 13, 1960 |

FOREIGN PATENTS

| | | |
|---|---|---|
| 541,584 | Great Britain | Dec. 2, 1941 |